United States Patent
Yoon

(10) Patent No.: US 10,764,835 B2
(45) Date of Patent: Sep. 1, 2020

(54) METHOD FOR CONTROLLING SMALL CELL AND APPARATUS THEREFOR

(71) Applicant: SAMSUNG ELECTRONICS CO., LTD., Suwon-si (KR)

(72) Inventor: Jisun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/261,742

(22) Filed: Jan. 30, 2019

(65) Prior Publication Data

US 2019/0246359 A1    Aug. 8, 2019

(30) Foreign Application Priority Data

Feb. 5, 2018    (KR) .......................... 10-2018-0014118

(51) Int. Cl.
| | |
|---|---|
| *H04W 52/24* | (2009.01) |
| *H04W 24/10* | (2009.01) |
| *H04W 24/02* | (2009.01) |
| *H04W 16/32* | (2009.01) |

(52) U.S. Cl.
CPC ......... *H04W 52/244* (2013.01); *H04W 16/32* (2013.01); *H04W 24/02* (2013.01); *H04W 24/10* (2013.01)

(58) Field of Classification Search
CPC ... H04W 52/244; H04W 16/32; H04W 24/02; H04W 24/10; H04W 24/08
See application file for complete search history.

(56) References Cited

U.S. PATENT DOCUMENTS

| | | | |
|---|---|---|---|
| 9,467,918 B1* | 10/2016 | Kwan | H04W 36/245 |
| 2015/0350926 A1* | 12/2015 | Uchiyama | H04W 52/244 |
| | | | 455/418 |
| 2016/0373970 A1* | 12/2016 | Kulal | H04W 36/0016 |
| 2017/0026914 A1* | 1/2017 | Madan | H04W 52/146 |
| 2017/0026915 A1* | 1/2017 | Madan | H04W 52/244 |
| 2017/0111919 A1* | 4/2017 | Madan | H04W 72/1273 |
| 2017/0111926 A1* | 4/2017 | Madan | H04W 72/1273 |
| 2018/0103486 A1* | 4/2018 | Madan | H04W 72/1273 |

OTHER PUBLICATIONS

Anonymous, "Technical Specification Group Radio Access Network; Small cell enhancements for E-UTRA and E-UTRAN", 3GPP TR 36.872 V12.1.0, Oct. 18, 2017, pp. 1-100 (total 100 pages).

* cited by examiner

*Primary Examiner* — Ankur Jain
(74) *Attorney, Agent, or Firm* — Sughrue Mion, PLLC

(57) ABSTRACT

A small cell control method includes: acquiring information on a plurality of cells; identifying at least one candidate of a small cell by determining whether one cell is overlaid on another cell based on the information on the plurality of cells; identifying at least one small cell to control transmitting power among the plurality cells; and controlling the identified at least one small cell.

15 Claims, 8 Drawing Sheets

METHOD FOR CONTROLLING SMALL CELL AND APPARATUS THEREFOR

CROSS-REFERENCE TO RELATED APPLICATION(S)

This application is based on and claims priority under 35 U.S.C. § 119(a) to Korean Patent Application No. 10-2018-0014118, filed on Feb. 5, 2018, in the Korean Intellectual Property Office, the disclosure of which is incorporated by reference herein in its entirety.

BACKGROUND

1. Field

The disclosure relates to a small cell control method, and more particularly, to a small cell control method and an apparatus therefor that can control the transmitting power intensity of a small cell based on information on a cell.

2. Description of Related Art

In order to meet the demand for wireless data traffic which has increased since the commercialization of fourth Generation (4G) communication systems, efforts have been made to develop an improved fifth Generation (5G) communication system or a pre-5G communication system. For this reason, 5G or pre-5G communication systems are called a "beyond 4G network communication system" or a "post long-term evolution (LTE) communication system".

In order to achieve a high data transfer rate, 5G communication systems are implemented in an ultra-high frequency (millimeter Wave (mmWave)) band (e.g., 60 GHz band). In order to reduce the path loss of radio waves and increase the transmission distance thereof in the mmWave band, techniques, such as beamforming, massive multiple-input multiple-output (MIMO), full-dimensional MIMO (FD-MIMO), array antennas, analog beamforming, and large scale antennas, are being discussed for 5G communication systems.

Also, in order to improve the network of a system, the development of techniques, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, has been conducted for 5G communication systems.

In addition, hybrid frequency shift keying (FSK) and quadrature amplitude modulation (QAM) modulation (FQAM) and sliding window superposition coding (SWSC), which are advanced coding modulation (ACM) schemes, as well as filter bank multi-carrier (FBMC), non-orthogonal multiple access (NOMA), and sparse code multiple access (SCMA), which are advanced access techniques, have been developed for 5G systems.

SUMMARY

Provided are methods and apparatuses for a small cell control for controlling the transmitting power intensity of a small cell.

Additional aspects will be set forth in part in the description which follows and, in part, will be apparent from the description, or may be learned by practice of the presented embodiments.

In accordance with an aspect of the disclosure, there is provided a small cell control method by a first server, including: acquiring information on a plurality of cells; identifying at least one candidate of a small cell by determining whether one cell is overlaid on another cell based on the information on the plurality of cells; identifying at least one small cell to control transmitting power among the plurality cells; and controlling the identified at least one small cell, wherein the information on the plurality of cells includes information based on received signal strength of an uplink reference signal.

In accordance with an aspect of the disclosure, there is provided a first server including: a transmission/reception unit configured to acquire information on a plurality of cells; and a controller configured to identify at least one candidate of a small cell by determining whether one cell is overlaid on another cell based on the information on the plurality of cells and to identify at least one small cell to control transmitting power among the plurality of cells, wherein the information on the plurality of cells includes information based on received signal strength of an uplink reference signal.

In accordance with an aspect of the disclosure, there is provided a method of controlling a small cell by a base station, including: acquiring first information on a plurality of cells; identifying at least one candidate of a small cell by determining whether one cell is overlaid on another cell based on the first information; identifying at least one small cell to control transmitting power among the plurality of cells; and controlling the identified at least one small cell, wherein the first information includes information based on received signal strength of an uplink reference signal.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
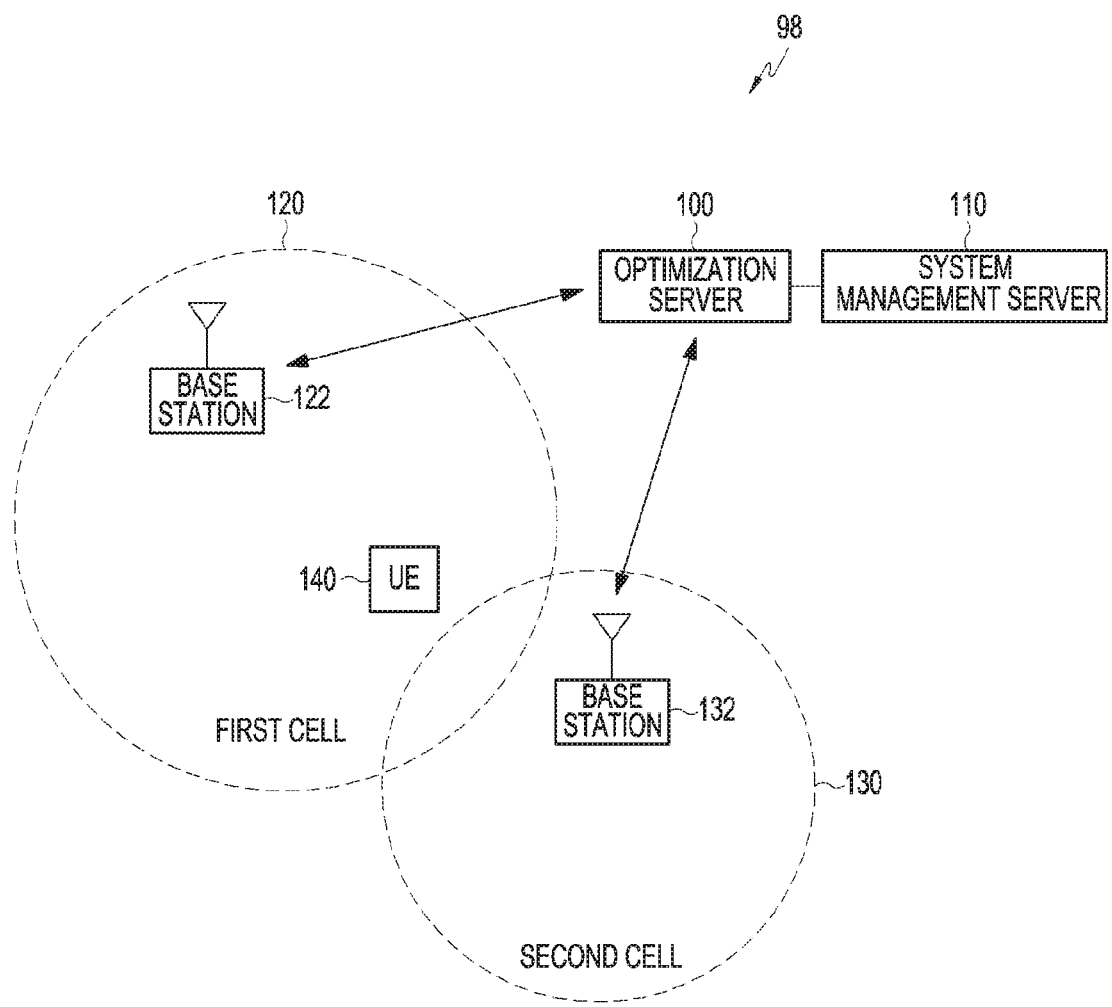
FIG. 1 is an exemplary diagram illustrating a system to which a small cell control method according to an embodiment can be applied.

Hereinafter, embodiments in which a small cell control method can be easily implemented will be described with reference to the accompanying drawings. However, in explaining the operation principle of embodiments of the disclosure, a detailed description of known functions and configurations incorporated herein will be omitted when it may make the subject matter of the disclosure rather unclear.

The terms used in the disclosure are only used to describe specific embodiments, and are not intended to limit the disclosure. A singular expression may include a plural expression unless they are definitely different in a context.

Expressions such as "at least one of," when preceding a list of elements, modify the entire list of elements and do not modify the individual elements of the list. For example, the expressions "at least one of a, b, and c" and "at least one of a, b, or c" should be understood as including only a, only b, only c, both a and b, both a and c, both b and c, or all of a, b, and c.

The disclosure relates to a fifth generation (5G) communication system or a pre-5G communication system for supporting higher data rates in a fourth generation (4G) communication system such as LTE and after the 4G communication system.

A wireless communication system is capable of operating a macrocell and a small cell, and it turns off the small cell in order to save energy.

The 3GPP defines small cell "ON/OFF" for a user equipment (UE), i.e., a user equipment apparatus, of release 12 (Rel-12) or higher. Small cell "ON/OFF", as defined in 3GPP, uses a discovery signal (DRS) and a DRS measurement timing configuration (DMTC) measurement report (MR), and can be operated only when a user equipment of Rel-12 or higher is present.

Embodiments provide a small cell control method and an apparatus therefor that may control the small cell "ON/OFF" in order to save energy even in an environment where there is no UE supporting the 3 GPP Rel-12 or higher standard.

Also, the small cell "ON/OFF" defined by the standard may cause a coverage hole due to the small cell "OFF".

Embodiments provide a small cell control method and an apparatus therefor that may determine a small cell in which coverage holes do not occur even if the small cell is turned off in order to determine whether only the small cell is turned off, thereby controlling the small cell "ON/OFF" without the occurrence of a coverage hole.

Accordingly, it is possible to control small cell "ON/OFF" even when there is no Rel-12 or higher UE.

Also, it is possible to periodically identify whether a small cell has the same coverage as a macrocell, thereby eliminating the occurrence of a coverage hole due to the small cell "OFF".

In an embodiment, the small cell "OFF" may include an operation of setting both the transmitting power and the received power of a base station of a small cell to 0 value or setting only the transmitting power to 0 value. The small cell "ON" in in an embodiment may include an operation of restoring the transmitting power (and the received power) that was previously set to 0 value back to the previous power intensity. The small cell ON/OFF may be referred to as a toggle of the small cell power.

After the small cell is turned off, the base station of the small cell periodically transmits a discovery signal (DRS) to the Rel-12 UE. The base station of the small cell can transmit the DRS to the Rel-12 UE by temporarily restoring the transmitting power only during a certain period of transmitting the DRS. The base station of a macrocell may receive a DRS measurement timing configuration (DMTC) measurement report (MR) from the Rel-12 UE and may use the received DMTC MR to determine whether the small cell is turned on. The DMTC MR is an MR for DRS, and can be used only in UE of Rel-12 or higher. Therefore, the small cell "ON/OFF" defined by the standard cannot be applied without UE of the Rel-12 or higher.

Accordingly, an embodiment provides a small cell control method capable of determining small cell "ON/OFF" using an uplink signal from a UE to a base station, for example, the received power intensity for a sounding reference signal (SRS), regardless of the type of the UE.

The small cell control method of an embodiment is based on the transmitting power control of a small cell. That is, the base station needs to turn on a reception function in order to receive an uplink signal from a UE. Accordingly, in the small cell control method according to an embodiment, the small cell "OFF" sets the transmitting power intensity to 0 value and the small cell "ON" restores the transmitting power intensity that was previously set to 0 value back to the previous transmitting power intensity.

The small cell "ON/OFF" using the Rel-12 UE of the 3 GPP may cause a coverage hole due to the small cell "OFF". The coverage hole refers to an area where the quality of wireless communication services deteriorates due to a poor radio reception state. In the standard, the DRS and the DMTC MR are used to determine whether a small cell is to be turned off in a macrocell. Accordingly, in the case of a UE in the small cell that is turned off, the radio reception state may not be good due to the occurrence of a coverage hole.

Therefore, a small cell control method according to an embodiment is capable of determining small cell "ON/OFF" by determining a small cell having a low probability that a coverage hole will occur.

FIG. 1 is an exemplary diagram illustrating a system to which a small cell control method according to an embodiment can be applied.

Referring to FIG. 1, a wireless communication system 98 of an embodiment may include a first cell 120 and a second cell 130. The wireless communication system may further include a system management server 110 that manages information about the first cell 120 and the second cell 130. The wireless communication system may further include an optimization server 100 different from the system management server 110. The optimization server 100 may determine small cell candidates according to the small cell control method of an embodiment, and may determine the small cell to be controlled among the candidates. The other server 100 may be referred to as a first server so as to be distinguished from the system management server 110. The system management server 110 may be referred to as a second server. The optimization server 100 does not have to be located separately from the first cell, the second cell, or the system management server 110, and may be provided (or implemented) in the first cell 120, the second cell 130, or the system management server 110.

A base station (BS) 122, i.e., a first base station, is present in the first cell 120 and a base station 132, i.e., a second base station, is present in the second cell 130. The user equipment 140 may belong to the coverage area of the first cell 120 or the coverage area of the second cell 130 according to the movement thereof. For convenience of description, it is assumed that the cell type of the first cell 120 is a macrocell and the cell type of the second cell 130 is a picocell.

The macrocell is a cell having a coverage area with a radius from few kilometers (km) to about 10 km. The small cell is a cell having a smaller coverage area than that of the macrocell, and may be a picocell, a femtocell, or the like depending on a range of the area. In an embodiment, a picocell is referred to as a small cell as compared to a macrocell.

The base station 122 or 132 may be an entity that communicates with the user equipment 140 and may include at least one from among a Node B (NB), an eNode B (eNB), an access point (AP), or the like.

The user equipment 140 is an entity that communicates with the base station 122 or 132 and may include at least one from among a mobile station (MS), mobile equipment (ME), a device, a terminal, or the like.

The system management server 110 is a server that manages configuration information and carrier aggregation (CA) information for all cells managed by the optimization server 100, and transmits the managed information to the optimization server 100. The system management server 110 may be, for example, an element management system (EMS).

A plurality of optimization servers 100 may exist according to the size of a city where the optimization server 100 is installed, and one optimization server 100 may manage, for example, 200 to 1000 cells.

The small cell control method according to an embodiment can be applied regardless of a single carrier and a multi-carrier according to the CA.

In the case of the single carrier, the first cell 120 is a macrocell and the second cell 130 is a small cell. In the case of the multi-carrier, it is assumed that the first cell 120 is a macrocell and a primary cell (Pcell), and the second cell 130 is a small cell and a secondary cell (Scell).

The Pcell is a cell that operates in a primary carrier at a CA, and may perform an initial connection setting procedure or initiate a connection resetting procedure.

The Scell is a cell that operates in a secondary carrier at a CA, and may be supplementary used for bandwidth expansion.

It is assumed that the first cell 120 uses carrier 1 and the second cell 130 uses carrier 2.

The following description is based on a single carrier, and also describes the examples of using a multi-carrier to which a CA is applied.

Figure 2:
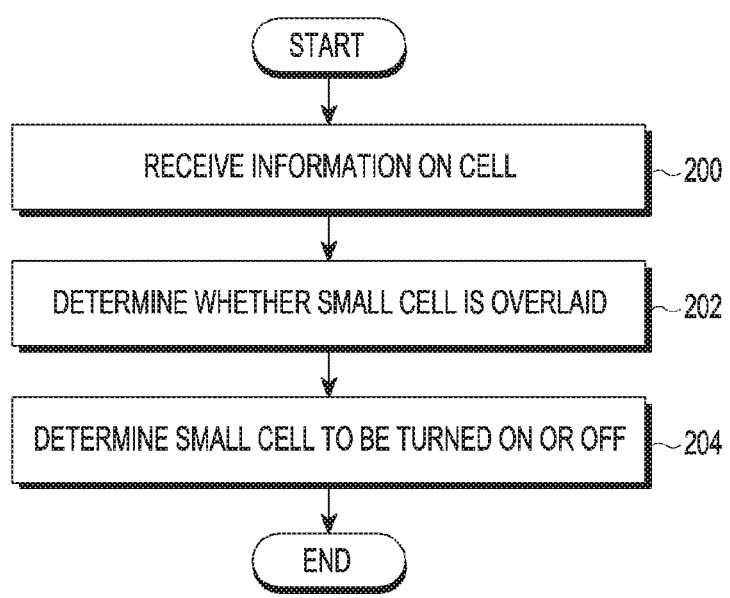
FIG. 2 is a flowchart illustrating a small cell control method according to an embodiment.

FIG. 2 is a flowchart illustrating a small cell control method according to an embodiment.

Referring to FIGS. 1 and 2, in operation 200, the optimization server 100 receives information on a cell from the base station 122 for the first cell 120, the base station 132 for the second cell 130, or the system management server 110.

In operation 202, the optimization server 100 determines whether the second cell 130, which is a small cell, is overlaid on a first cell 120, which is the macrocell, by using the received information on the cell. When it is determined that the second cell 130 is overlaid on the first cell 120, the optimization server 100 may determine that the second cell 130 is the small cell candidate to be controlled.

In operation 204, the optimization server 100 determines the small cell to be controlled among the determined candidates. That is, it is possible to determine the small cell to control the transmitting power intensity of the base station among the determined candidates.

Figure 3:
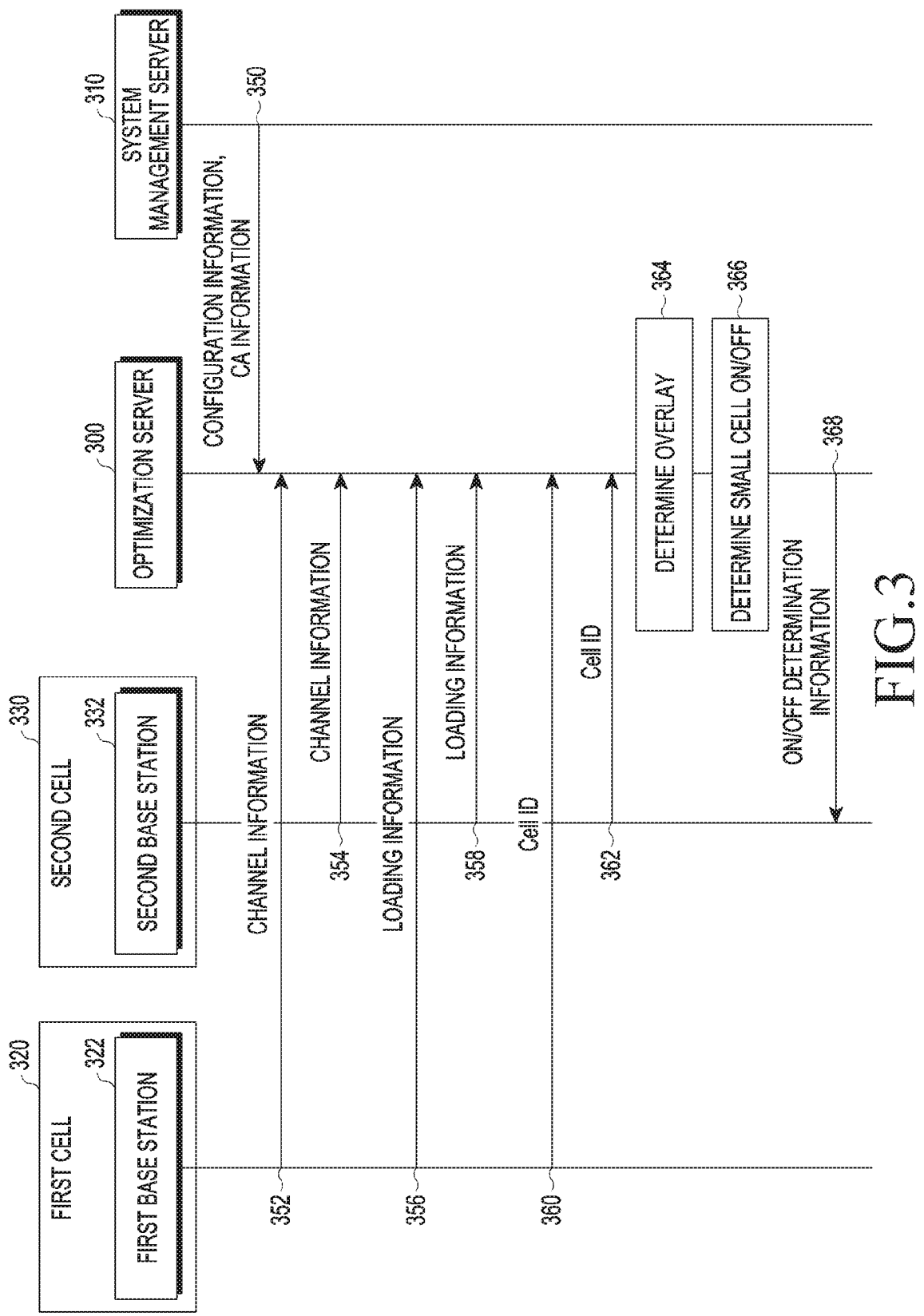
FIG. 3 is a flowchart between entities illustrating a small cell control method according to an embodiment.

FIG. 3 is a flowchart between entities illustrating a small cell control method according to an embodiment. Certain details of the description above with reference to FIGS. 1 and 2 are applicable here.

Referring to FIG. 3, the optimization server 300 receives the information on the cell for each information collection period in operations 350 to 362, determines whether a second cell 330, e.g., a small cell, is overlaid on a first cell 320, e.g., a macrocell, in operation 364, and determines the small cell to be turned on or off among the small cells which are determined to be overlaid in operation 366.

First, the system management server 310 stores configuration information of all cells managed by the optimization server 300, and stores CA information together depending on whether the CA is available. The optimization server 300 receives the configuration information of the cell from the system management server 310. In operation 350, when the CA is applied, a larger amount of CA information may be received.

The configuration information of the cell includes at least one of a small cell ON/OFF possibility (impossible/possible), a small cell ON/OFF control period, an overlay determination period, neighbor cell information, and the cell type (macro or pico). In addition, when a multi-carrier is used, the configuration information of the cell may further include a Pcell change condition. The Pcell change condition may be, for example, a handover condition, and the handover condition may be an event A3 of TS 36.331. The overlay determination period may be, for example, 24 hours, and the small cell ON/OFF control period may be, for example, 10 minutes. However, these are examples, and they can be set differently according to the operator.

The CA information of the cell may include a collocated cell, an Scell add condition, an Scell release condition, an Scell change condition, an Scell activation condition, an Scell deactivation condition, and the like. The collocated cell is a cell that has the same or a similar coverage area while using a carrier different from that of the corresponding cell. The Scell add condition, the Scell release condition, and the Scell change condition may be, for example, an event A4, an event A2, and an event A6 of TS 36.331, respectively.

The optimization server 300 receives channel information on the first cell 320 from the first base station 322 of the first cell 320 in operation 352, and receives channel information on the second cell 330 from the second base station 332 of the second cell 330 in operation 354.

Specifically, the optimization server 300 may receive a received power intensity of an uplink reference signal, which is received by the first base station 322 of the first cell 320 from a UE, as the channel information. The uplink reference signal may be, for example, a sounding reference signal (SRS). Similarly, the optimization server 300 may receive a received power intensity of the SRS, which is received by the second base station 332 of the second cell 330 from a UE, as the channel information.

In the case of a multi-carrier environment where the first cell 320 and the second cell 330 use different carriers, the second base station 332 of the second cell 330 may use a periodic MR rather than directly transmitting the received power intensity of the SRS to the optimization server 300. That is, in the case of the multi-carrier environment, the second base station 332 of the second cell 330 may collect reference signal received power (RSRP) from the UE through the periodic MR, and may transmit the collected RSRP as the channel information.

The optimization server 300 receives loading information of the first cell 320 and loading information of the UE of the first cell 320 from the first base station 322 of the first cell 320 in operation 356. The optimization server 300 receives loading information of the second cell 330 and loading information of the UE of the second cell 330 from the second base station 332 of the second cell 330 in operation 358.

Specifically, during the information collection period, the first base station 322 of the first cell 320 calculates a resource usage ratio for the first cell 320 and a resource usage ratio for the UE of the first cell 320. The resource is a resource that can be operated in a corresponding cell, and may be, for example, a physical resource block (PRB). The optimization server 300 may receive the calculated PRB usage ratio for the first cell 320 and PRB usage ratio for the UE of the first cell 320.

Also, during the information collection period, the second base station 332 of the second cell 330 calculates a resource usage ratio for the second cell 330 and a resource usage ratio for the UE of the second cell 330. The resource usage ratio may be, for example, a PRB usage ratio. The optimization server 300 receives the calculated PRB usage ratio for the second cell 330 and PRB usage ratio for the UE of the second cell 330.

The optimization server 300 receives a cell ID of the first cell 320 from the first base station 322 of the first cell 320 in operation 360, and receives a cell ID of the second cell 330 from the second base station 332 of the second cell 330 in operation 362.

In the case of the multi-carrier environment where the first cell 320 and the second cell 330 use different carriers, the first cell 320, which is the Pcell, knows cell ID information of the second cell 330, which is the Scell. Accordingly, in this case, the optimization server 300 may receive the cell ID of the first cell 320 and the cell ID of the second cell 330 from the first base station 322 of the first cell 320 together. The optimization server 300 may further receive frequency allocation information of the first cell 320 and frequency allocation information of the second cell 330 from the first base station 322 of the first cell 320.

The information collection period may be, for example, 1.28 seconds, but is not limited thereto and may be set differently according to the operator.

Although the optimization server 300 is exemplarily described using two cells, e.g., a first cell 320 and a second cell 330, the optimization server 300 may receive configuration information on all of the cells managed by the optimization server 300 and CA information from the system management server 310, and may receive information on each cell from all of the cells managed by the optimization server 300.

The optimization server 300 determines whether the small cell among all of the cells managed by the optimization server 300 is overlaid on an arbitrary macrocell based on the received information on the cell in operation 364. When it is determined that the arbitrary small cell is overlaid on the arbitrary macrocell, the small cell may be determined to be a candidate for the small cell to be turned on/off. For example, when it is determined that the second cell 330 is the small cell overlaid on the first cell 320, the second cell 330 may be determined to be a candidate for the small cell to be turned on/off.

Next, in operation 366, the optimization server 300 determines the small cell to be actually turned on or off among the determined candidates in operation 366. When it is determined that the second cell 330 is the small cell to be turned off, information on the small cell to be turned off is transmitted to the second cell 330 in operation 368, so that the transmitting power of the second base station 332 may be applied as 0 value to the corresponding cell.

Operations 364 to 368 will be described in detail with reference to FIGS. 4 to 7.

Figure 4:
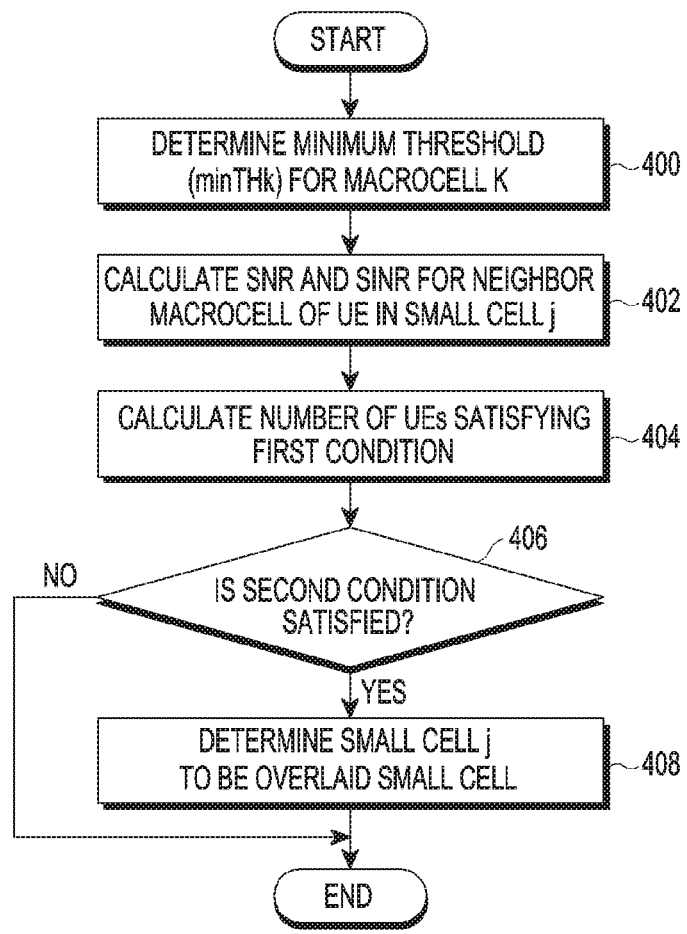
FIG. 4 is a flowchart illustrating a control method of determining whether a small cell is overlaid according to an embodiment.

FIG. 4 is a flowchart illustrating a method of determining whether a small cell is overlaid according to a small cell control method of an embodiment. Certain details of the description above with reference to FIGS. 1 to 3 are applicable here.

First, in operation 400, the optimization server 300 determines a minimum threshold value $minTH_k$ or an arbitrary macrocell k.

The optimization server 300 uses received power of an uplink reference signal of a UE using the arbitrary macrocell k as a serving cell, current transmitting power of a base station of the macrocell k, and noise and interference (NI) information to calculate a signal to noise ratio (SNR) for each UE using the macrocell k as the serving cell. The SNR is only an example and does not exclude other signal quality information such as received signal received power (RSRP) or signal to interference plus noise ratio (SINR), in addition to the SNR. NI information means a prediction value for noise and interference of signals that the UE can receive from the base station of the serving cell and the base station of the neighbor cell.

The SNR of the UE using the macrocell k as the serving cell can be calculated using SRS received power (SRSRx Power), the current transmitting power (TxPower), and the NI information (NI), as shown in Equation 1 below. In Equation 1, UE is an index for identifying user equipment apparatuses (UEs) when there is a plurality of UEs using the macrocell k as the serving cell.

$$SNR_{UE,k} = \frac{SRSRxPower_{UE,k} \times TxPower_k}{NI_{UE,k}} \quad \text{[Equation 1]}$$

The optimization server 300 may obtain an SNR of a UE in the macrocell k using SRS received power, which is an uplink reference signal, current transmitting power of the macrocell k, and NI information of the UE in the macrocell k.

A minimum SNR of the arbitrary macrocell k is determined as the minimum value among the SNR values of UEs.

$$minSNR_k = min(SNR_{UE,K}) \quad \text{[Equation 2]}$$

That is, the optimization server 300 may determine the minimum SNR among the SNRs of the UE in the macrocell k as the minimum SNR of the macrocell k.

The optimization server 300 may determine the determined minimum SNR as a minimum threshold value $minTH_k$ of the macrocell k; that is, $minSNR_k = minTH_k$.

The optimization server 300 may further consider a planning SNR (PlanningMinSNR) for an arbitrary macrocell in determining the minimum threshold. The PlanningMinSNR may be calculated based on a network planning RSRP threshold (PlanningRSRPTH). Depending on network operators, the network planning RSRP threshold may or may not be set, such that the PlanningMinSNR can be considered only when the network planning RSRP threshold is set. The network planning RSRP threshold is a minimum RSRP value set by a provider at the time of network design.

The PlanningMinSNR may be determined based on the network planning RSRP threshold and thermal noise as shown in Equation 3.

$$PlanningMinSNR = PlanningRSRPTH/Thermal\ Noise \quad \text{[Equation 3]}$$

When the network planning RSRP threshold is set, the optimization server 300 can derive the value $minTH_k$ of the macrocell k as shown in Equation 4 using $minSNR_k$ obtained from Equation 2 and the PlanningMinSNR of Equation 3.

$$minTH_k = min(minSNR_k, PlanningMinSNR) \quad \text{[Equation 4]}$$

That is, when the network planning RSRP threshold is set, the optimization server 300 may determine a smaller value among the SNR minimum value and the PlanningMinSNR for the macrocell k as minTH$_k$ the macrocell k.

Next, in operation 402, the optimization server 300 calculates an SNR and an SINR for a neighbor macrocell of a UE in an arbitrary small cell. The SNR and the SINR are merely examples, and do not exclude other pieces of signal quality information other than the SNR and the SINR.

Assuming that a small cell j is turned off, the neighbor macrocell refers to a macrocell that transmits a signal having the largest received signal strength among the strengths of signals which UEs in a coverage area of the small cell j receive from a neighbor macrocell of the small cell j. The neighbor macrocell may be referred to as a best neighbor macrocell.

Accordingly, the SNR and SINR for the neighbor macrocell calculated in operation 402 can be referred to as BestMacroSNR and BestMacroSINR, respectively.

The BestMacroSNR and the BestMacroSINR are calculated using Equations 5 and 6, respectively.

$$BestMacroSNR_{UE,j} = \frac{SRSRxPower_{UE,bestNbr} \times TxPower_{bestNbr}}{NI_{UE,j}} \quad \text{[Equation 5]}$$

$$BestMacroSINR_{UE,j} = \frac{SRSRxPower_{UE,bestNbr} \times TxPower_{bestNbr}}{NI_{UE,j} + Sum(SRSRxPower_{UE,restNbr} \times TxPower_{restNbr})} \quad \text{[Equation 6]}$$

In Equations 5 and 6, UE denotes an index for identifying UEs when there is a plurality of UEs having a serving cell j, bestNbr denotes a neighbor macrocell that transmits the signal having the largest received signal strength as described above, that is, a best neighbor macrocell, and restNbr denotes a neighbor cell of the small cell j except for the bestNbr.

Assuming that the small cell j is turned off, the optimization server 300 may calculate an SNR for the neighbor macrocell (e.g., the best neighbor macrocell) of the UE in the small cell j based on an SRS received power intensity for the best neighbor macrocell, the current transmitting power intensity of the best neighbor macrocell, and NI information.

In addition, assuming that the small cell j is turned off, the optimization server 300 may calculate an SINR for the neighbor macrocell (e.g., the best neighbor macrocell) of the UE in the small cell j based on the SRS received power intensity for the best neighbor macrocell, the current transmitting power intensity of the best neighbor macrocell, the NI information, an SRS received power intensity for at least one neighbor cell of the small cell j except for the best neighbor macrocell, and the current transmitting power intensity of the neighbor cell.

Next, in operation 404, the optimization server 300 calculates the number of UEs of an arbitrary small cell that satisfies a first condition using a minimum threshold of the determined macrocell, the calculated SNR, the calculated SINR, and a predetermined coverage threshold.

The first condition may include at least one of the following Equations 7 and 8. As an example, when only the condition of Equation 7 for SNR is satisfied, the first condition is satisfied. Thus, the optimization server 300 may determine whether the small cell is overlaid only using BestMacroSNR$_{DE,j}$. However in order to ensure more accurate determination whether the corresponding small cell is overlaid, a satisfaction of both inequalities can be determined by further considering Equation 8 for SINR, thereby determining the satisfaction of the first condition. The reason for further considering the SINR is that the SINR is a value that further considers the interference effect on the neighbor cell. Thus, the optimization server 300 may also use BestMacroSINR$_{UE,j}$ considering the interference effect on the neighbor cell to increase the accuracy of the determination whether the small cell is overlaid.

$$BestMacroSNR_{UE,j} > minTH_{BestNbr} \quad \text{[Equation 7]}$$

$$BestMacroSINR_{UE,j} > coverageTH \quad \text{[Equation 8]}$$

In Equation 7, minTH$_{BestNbr}$ denotes a minimum threshold calculated using Equations 1 and 2. That is, assuming that the small cell j is turned off, Equation 7 corresponds to a case in which an SNR calculated using the BestNbr, which is the neighbor macrocell of the UE in the small cell j, as a serving cell exceeds a minimum SNR (minimum threshold) of the BestNbr.

In Equation 8, coverageTH denotes a coverage threshold for SINR, and may be arbitrarily set by an operator. The coverage threshold for SINR is a value indicating that signal transmission/reception is unstable when the SINR falls below the threshold, which may mean the minimum signal quality. For example, the coverageTH may have a value of −7 dB by default. Accordingly, assuming that the small cell j is turned off, Equation 8 may correspond to a case in which an SINR calculated using the BestNbr, which is the neighbor macrocell of the UE in the small cell j, as a serving cell maintains the minimum signal quality.

The number of UEs satisfying the first condition is calculated for the arbitrary small cell j, and the number of UEs satisfying the first condition is referred to as NumOverlaidUE$_j$.

In operation 406, the optimization server 300 determines whether the small cell j satisfies the second condition of Equation 9. The determination as to whether the second condition is satisfied is performed by determining whether a ratio of the number of UEs of the small cell j satisfying the first condition to the total number of UEs in the small cell j is equal to or greater than a predetermined overlay threshold OverlayTH. In operation 408, when the second condition is satisfied, it is determined that the small cell j is overlaid on the neighbor macrocell. The optimization server 300 identifies the small cell j determined to be overlaid as a small cell candidate to be controlled.

The second condition can be expressed as Equation 9.

$$\frac{NumOverlaidUE_j}{NumUE_j} \times 100\ (\%) \geq OverlayTH(Default:100\%) \quad \text{[Equation 9]}$$

In the following Equation, denominator NumUE$_j$ denotes the total number of UEs of the small cell j. The OverlayTH can be set by an operator. For example, a default of the OverlayTH may be set to 100%; however, this is not limiting.

For example, it is assumed that the total number of UEs of the small cell j is 10.

When the OverlayTH of the small cell j is set to 100%, the meaning of satisfying the second condition is that the small cell j is determined to be overlaid on the BestNbr when all the 10 UEs of the small cell j satisfy the first condition. That is, the optimization server 300 may determine that the small cell j is overlaid when all the UEs in the small cell j can be included in the coverage area of the BestNbr, which is the neighbor macrocell.

When the OverlayTH of the small cell j is set to 50%, the meaning of satisfying the second condition is that the small cell j is determined to be overlaid on the BestNbr when 5 UEs, which are half of all the UEs in the small cell j, satisfy the first condition. That is, the optimization server 300 may determine that the small cell j is overlaid when only the 5 UEs in the small cell j can be included in the coverage area of the BestNbr, which is the neighbor macrocell.

The closer the OverlayTH is to 100%, the lower the likelihood that a coverage hole will occur. This is because when the OverlayTH is 100%, all UEs in the small cell j are included in the coverage area of the neighbor macrocell.

Figure 5:
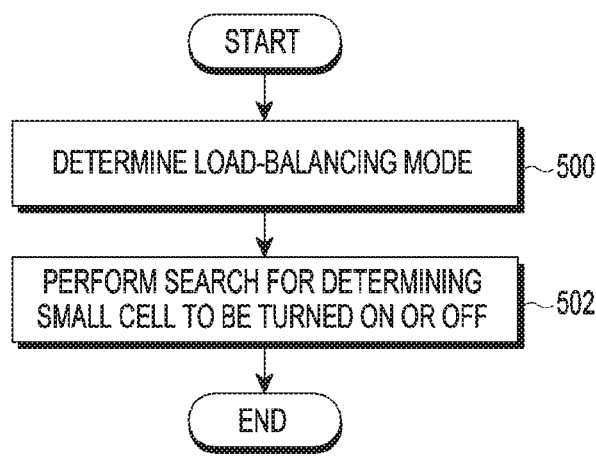
FIG. 5 is a flowchart illustrating a control method of determining a small cell to be turned on or off according to an embodiment.

FIG. 5 is a flowchart illustrating a method of determining a small cell to be turned on or off according to a small cell control method of an embodiment. Certain details of the description above with reference to FIGS. 1 to 4 are applicable here.

When the optimization server 300 identifies candidates of the small cell to be turned on or off by determining whether all the small cells managed by the optimization server 300 are overlaid, the small cells to be turned on or off may be identified so that the spectral efficiency of cells linked to the optimization server 300 is optimized among the candidates.

A load-balancing mode is determined in operation 500, and a search for determining a small cell to be turned on or off is performed in consideration of the load-balancing mode in operation 502.

The optimization server 300 may determine the load-balancing mode in consideration of resource usage ratios of all of the cells managed by the optimization server 300. The resource may be, for example, PRB. In other words, the optimization server 300 may determine the load-balancing mode according to whether the PRB usage ratio exceeds the threshold for the PRB usage ratio, in consideration of the PRB usage ratios of all of the cells managed by the optimization server 300.

The threshold for the PRB usage ratio may be set in advance in the optimization server 300. The threshold for the PRB usage ratio is set to a value close to 100%, for example, 80% or 90%. When the PRB usage ratio is close to 100%, it can be referred to as a full loading environment.

When the PRB usage ratios of all of the cells managed by the optimization server 300 exceed the threshold for the PRB usage ratio, the optimization server 300 may determine that the full loading environment is satisfied, and may select a UE number balancing mode in which the number of UEs of the cell can be made uniform in the case of the full loading environment. In the full loading environment, resources are used at the maximum allowable level, so it is desirable to pursue the fairness of the UE by making the number of UEs serviced per cell uniform.

When the PRB usage ratios of all of the cells managed by the optimization server 300 are equal to or smaller than the threshold for the PRB usage ratio, the optimization server 300 determines that the corresponding environment is a partial loading environment as a concept against full loading. Partial loading refers to an environment where the PRB usage ratios of all of the cells are relatively small compared to full loading. The determination as to whether the PRB usage ratios of all of the cells are relatively small may be performed through the threshold for the PRB usage ratio. In the case of the partial loading environment, a PRB balancing mode is selected so that the PRB usage ratios of all of the cells can be made uniform. The reason for selecting the PRB balancing mode in the partial loading environment is that it is possible to increase the PRB usage ratios of all of the cells in order to equalize the PRB usage ratios of the cells because there is still an additional allowable resource.

A search process in operation 502 may use, for example, a tabu search technique, which is one of the search techniques. The optimization server 300 may set the number of searches in advance, such as in the tabu search technique, and may perform a search only a predetermined number of times. In the search process in operation 502 for identifying the small cell to be controlled, the optimization server 300 first selects an arbitrary small cell among the candidates and determines the power intensity of the selected small cell. The optimization server 300 may calculate a reference value for the selected arbitrary small cell and the determined power intensity and determine whether to determine the selected arbitrary small cell using the reference value.

A specific search process in operation 502 will be described in detail with reference to FIGS. 6 and 7 and certain details of the description above with reference to FIGS. 1 to 5 are applicable.

Figure 6:
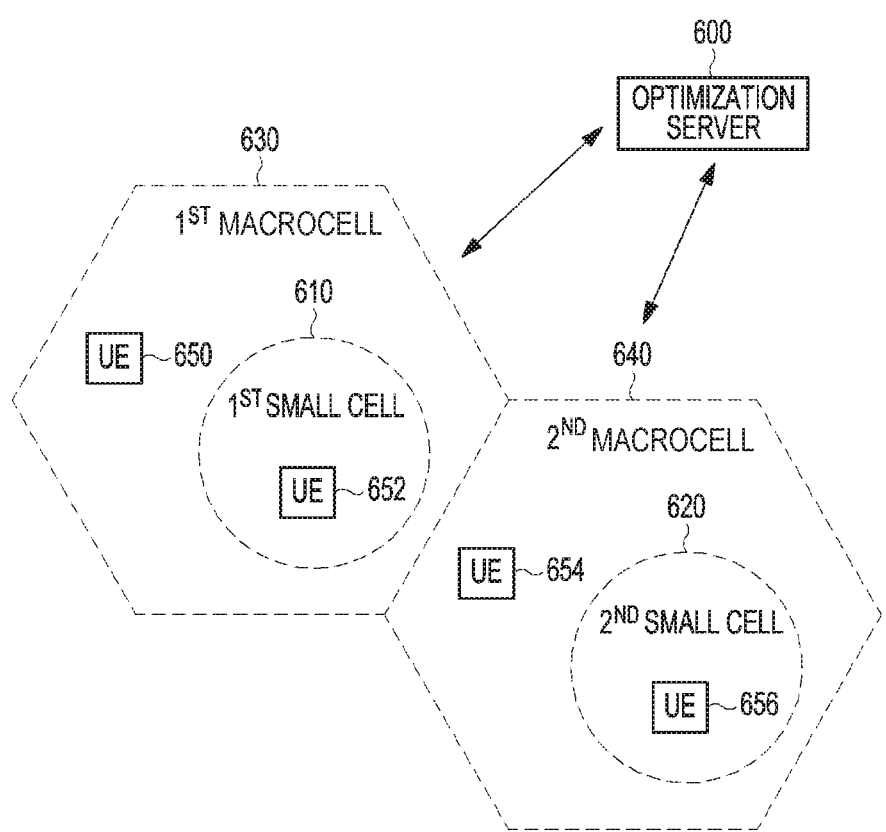
FIG. 6 is an exemplary diagram illustrating a small cell to be turned on or off according to an embodiment.

Referring to FIG. 6, a wireless communication system includes a first small cell 610, a second small cell 620, a first macrocell 630, and a second macrocell 640, and includes an optimization server 600 that manages the above cells. In FIG. 6, the optimization server is shown as being located outside the first and second macrocells, but it is not necessarily located as described above. That is, the optimization server may be located inside the first macrocell or the second macrocell. A case is assumed in which the first small cell 610 is overlaid on the first macrocell 630 and the second small cell 620 is overlaid on the macrocell 640 so that the first small cell 610 and the second small cell 620 are determined to be candidates to be controlled by the optimization server 600. In addition, it is assumed that the current transmitting power of the first macrocell 630 and the current transmitting power of the second macrocell 640 have a value of 20, and the current transmitting power of the first small cell 610 and the current transmitting power of the second small cell 620 have a value of 10.

Figure 7:
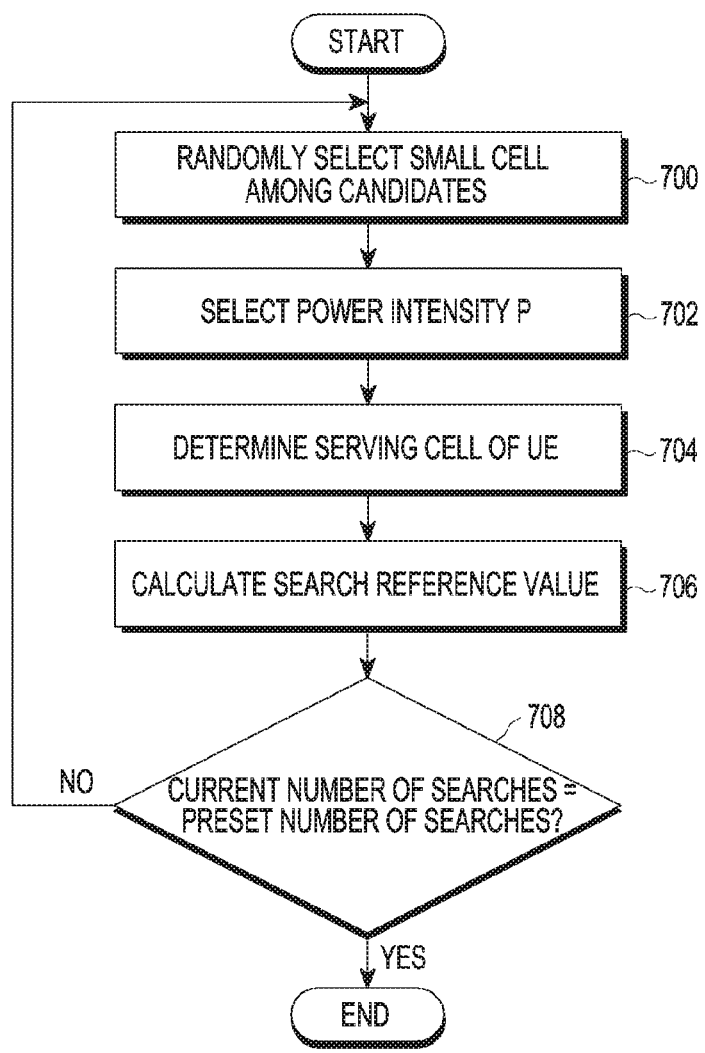
FIG. 7 is a flowchart illustrating a search procedure for determining a small cell to be turned on or off according to an embodiment.

Referring to FIG. 7, in operation 700, the optimization server 600 randomly selects an arbitrary small cell among small cells which are determined to be overlaid and determined as candidates to be turned on or off. Search may be performed a predetermined number of times according to tabu search, rather than sequentially considering whether to turn off all of the cells determined as the candidates, i.e., whether the transmitting power is 0 value. Therefore, the optimization server 600 may randomly select the small cell among the candidates. For example, in FIG. 6, the optimization server 600 may select the first small cell 610.

Next, in operation 702, the optimization server 600 selects power intensity P for the selected small cell. The power intensity P may be determined from a range of the power intensity of the cell. Two ranges of the power intensity of the cell (for example, 1 or 2) may be provided. When the range of the power intensity is "1", the power intensity may have one value, and when the range of the power intensity is "2", the power intensity may have two values. The range of the power intensity of the small cell may be "2". One of the two values that the power intensity of the small cell has may be the current transmitting power of a base station of the small cell and the other thereof may be 0 value (i.e., turning off the transmitting power). For example, in FIG. 6, the power intensity P of the first small cell 610 may be selected to be 10, which is the current transmitting power, or may be selected to be 0 value.

In operation 704, the optimization server 600 determines a serving cell of a UE at the power intensity P.

The optimization server 600 determines the serving cell for the UEs in all of the cells managed by the optimization server 600. However, since the search is performed while changing the small cell and the power intensity of the small cell each time the search is performed, the optimization server 600 may determine the serving cell only for the UEs in the selected small cell. The optimization server 600 may determine the serving cell based on received signal strength in a general handover procedure. That is, in the handover procedure, the serving cell may be determined considering a handover margin. For example, in the case in which the current serving cell of the UE is a cell a, when the sum of a received signal strength from a base station of another cell b neighbor to the cell a and the handover margin is equal to or greater than the received signal strength from the base station of the serving cell a (i.e., the received signal strength for the other cell b+handover margin≥the received signal strength for the serving cell a), the cell b may be determined to be the serving cell. The handover margin is a value set by an operator to prevent frequent handovers (i.e., ping pong phenomenon) which occur due to a slight difference in the received signal strength. For example, when the handover margin is 0, a cell having a received signal strength larger than the received signal strength for the current serving cell may be determined as the serving cell to be the target of the handover. Alternatively, the optimization server 600 may determine a cell including a base station that transmits a signal having the largest received signal strength among signals received by the UE, to be the serving cell of the corresponding UE.

For example, it is assumed that the first small cell 610 is selected in FIG. 6 and the power intensity P of the first small cell 610 is selected as 0 value. Since the strength of the signal received from the first macrocell 630 is the largest regardless of the selection of the power intensity of the first small cell 610, a serving cell of a UE 650 is the first macrocell 630. Similarly, a serving cell of a UE 654 is the second macrocell 640, and a serving cell of a UE 656 is the second small cell 620. However, in the case of a UE 652, the serving cell may be changed by selecting the power intensity of the first small cell 610 as 0 value. The UE 652 may receive a signal transmitted by the base station of the first macrocell 630, which is a macrocell on which the first small cell 610 is overlaid among the received signals, at the largest received power intensity. Therefore, the optimization server 600 may determine the serving cell of the UE 652 as the first macrocell 630.

In a multi-carrier environment to which a CA is applied, a Pcell and an Scell may be determined instead of the serving cell.

Next, in operation 706, the optimization server 600 calculates a search reference value in consideration of a load-balancing mode determined according to a loading environment. When the load-balancing mode is the UE number balancing mode, the search reference value is a log sum of the estimated throughput of the UE under the selected power intensity, and when the load-balancing mode is a PRB balancing mode, the search reference value is a log sum of the estimated PRB usage ratio of the UE under the selected power intensity. When all the load-balancing modes are the PRB balancing mode, the log sum of the estimated throughput of the UE may be used as a constraint condition.

In order to calculate the log sum of the estimated throughput of the UE, which is the search reference value or the log sum of the estimated PRB usage ratio of the UE, the estimated throughput of the UE, the estimated PRB usage ratio of the UE, the SINR of the UE, and the estimated capacity of the UE are required to be calculated. A description of the calculation process will be given later with reference to Equations below.

The optimization server 600 may temporarily store the small cell and the power intensity P of the small cell when the search reference value calculated in each search operation is a search reference value capable of optimizing the frequency efficiency.

The meaning of the search reference value capable of optimizing the frequency efficiency can be applied differently depending on the load-balancing mode.

For example, when the load-balancing mode is the UE number balancing mode, since the load is adjusted so that the number of UEs of all of the cells can be uniform, the optimization server 600 may compare a search reference value (i.e., the log sum of the estimated throughput of the UE) calculated in the current search operation with a search reference value calculated in the immediately preceding search operation, and may temporarily store the larger search reference value of the two search reference values and a combination of the small cell and the power intensity P at the time of the larger search reference value (i.e., the search reference value and the combination of the small cell and the power intensity). That is, in each search operation, the optimization server 600 may update the larger search reference value and the combination of the small cell and the power intensity P at the time of the larger search reference value.

For example, when all the load-balancing modes are the PRB load-balancing mode, since the load is adjusted so that the PRB usage ratios of all of the cells can be uniform, the optimization server 600 may compare a search reference value (i.e., the log sum of the estimated PRB usage ratio of the UE) calculated in the current search operation with the search reference value calculated in the immediately preceding search operation, and may temporarily store the smaller search reference value of the two search reference values and a combination of the small cell and the power intensity P at the time of the smaller search reference value. That is, in each search operation, the optimization server 600 may update the smaller search reference value and the combination of the small cell and the power intensity P at the time of the smaller search reference value.

Additionally, the optimization server 600 may set a constraint condition to further consider whether the search reference value calculated in the current search operation satisfies the constraint condition.

For example, in the case in which the load-balancing mode is the PRB balancing mode, when the search reference value calculated in the current search operation satisfies the constraint condition even though the search reference value calculated at the current operation (i.e., the log sum of the estimated PRB usage ratio of the UE) is smaller than the search reference value calculated in the immediately preceding search operation, the search reference value calculated at the current search operation may not be stored. That is, the update may not be performed. The constraint condition will be described later.

In operation 708, the optimization server 600 compares the current number of searches with a preset number of searches. When the current number of searches is equal to the preset number of searches, a sufficient number of searches have been performed and the search is completed. When the current number of searches is not equal to the preset number of searches, the number of searches is incremented by one and then operations 700 to 708 are repeated.

The optimization server 600 may control the small cell with the power intensity of the small cell by adopting the small cell and the power intensity of the small cell at the time of the search reference value which is finally stored after the search is completed.

For example, referring to FIG. 6, a search may be performed as shown in Table 1 below.

In each searching operation, the power intensity of the macrocell is fixed at the current transmitting power, the small cell is selected randomly, and the power intensity of the selected small cell is also randomly selected.

TABLE 1

| Search 1 | First Macrocell, 20 | Second Macrocell, 20 | First Small cell, 0 | Second Small cell, 10 |
|---|---|---|---|---|
| Search 2 | First Macrocell, 20 | Second Macrocell, 20 | First Small cell, 10 | Second Small cell, 0 |

The optimization server 600 may select the first small cell 610 in a first search operation (i.e., search 1) and perform a search by selecting the power intensity P as 0 value. The optimization server 600 may select the second small cell 620 in a second search operation (i.e., search 2) and perform a search by selecting the power intensity P as 0 value.

The optimization server 600 calculates the search reference value at each search operation. Assuming the PRB balancing mode, the optimization server 600 calculates the "log sum of the estimated PRB usage ratio of the UE" as the search reference value. Assuming that only two searches are performed in total, the optimization server 600 compares the "log sum of the estimated PRB usage ratio of the UE" in search 1 and the "log sum of the estimated PRB usage ratio of the UE" in search 2, and determines a combination of the small cell providing the smaller "log sum of the estimated PRB usage ratio of the UE" and the power intensity P thereof. When the "log sum of the estimated PRB usage ratio of the UE" calculated in search 2 is smaller than that in search 1, the optimization server 600 may determine that the second small cell 620 may be turned off according to the small cell/power intensity combination of search 2.

When the number of overlaid small cells is one instead of a plurality, the operation of randomly selecting the small cell in the search process may be omitted. In this case, the optimization server 600 may select whether the power intensity P of one small cell determined to be overlaid is used as the current transmitting power or is 0 value, and may perform the calculation of the search procedure.

Hereinafter, a process of calculating the search reference value in operation 706 will be described in detail with reference to Equations below.

First, when the load-balancing mode is the UE number balancing mode, a process of calculating the log sum SumOfLogUETput$_{Full,P}$ of the estimated throughput of all the UEs, which is the search reference value, will be described using Equation 10.

In order to calculate the log sum SumOfLogUETput$_{Full,P}$ of the estimated throughput of the UE, the estimated throughput of an individual UE must be calculated.

[Equation 10]

$$UETput_{Full,P,m} = \sum_{j_{P,m}} \left( \sum_{j'_{P,m}} \frac{1}{NumUE_{j'_{P,m}}} \right) *$$

$$\left( \frac{Capacity_{Full,P,j_{P,m},m}}{\sum_{j'_{m}} Capacity_{Full,P,j'_{P,m},m}} \right) * Capacity_{Full,P,j_{P,m},m}$$

In Equation 10, UETput$_{Full,P,m}$ an estimated UE throughput of a UE m at the time of the power intensity P in the full loading environment. The full loading environment denotes an environment in which the PRB usage ratios of all of the cells are equal to or greater than the threshold of the PRB usage ratio, and the full loading environment corresponds to a case in which the load-balancing mode is the UE number balancing mode.

Also, j$_{P,m}$ denotes a serving cell index of the UE m (in the case of a multi-carrier, cell indexes of PCellP and SCellP of the UE m) at the power intensity P, Capacity$_{Full,P,j_{P,m},m}$ denotes the estimated capacity of the UE m for the cell j$_{P,m}$ at the time of the power intensity P in the full loading environment, and denotes the number of UEs of the cell j$_{P,m}$ at the power intensity P.

That is, the optimization server 600 may calculate UETput$_{Full,P,m}$ based on the estimated capacity of the UE m in the cell j at the power intensity P and the number of UEs of the cell j at the power intensity P.

The estimated capacity can be derived using an SINR of the UE m.

First, the SINR of the UE m may be calculated by applying Equation 6 described above. That is, the optimization server 600 may calculate the SINR of the UE m by using SRS received power for a serving cell base station of the UE m, current transmitting power of the serving cell base station, NI information, SRS received power for a neighbor cell base station, and current transmitting power of the neighbor cell base station. The optimization server 600 stores an operation table capable of estimating capacity from the SINR of the UE. The optimization server 600 derives the estimated capacity from the SINR of the UE through the pre-stored operation table.

Based on Equation 10, SumOfLogUETput$_{Full,P}$ denotes a value obtained by summing the values obtained by performing a log on the estimated throughput UETput$_{Full,P,m}$ of the individual UE, with respect to all the UEs managed by the optimization server 600 at the time of the power intensity P in the full loading environment. That is, the optimization server 600 performs a log on the estimated UE throughput of the UE m calculated using Equation 10. The optimization server 600 may derive a value obtained by performing a log on the estimated UE throughput for all the UEs, and may sum the values obtained by performing a log on the estimated UE throughput to calculate the log sum SumOfLogUETput$_{Full,P}$ of the estimated throughput of the UE, which is the search reference value.

Next, in the PRB balancing mode, the log sum (SumOfLogTotalUEPRBusageRatio$_P$) of the estimated PRB usage ratio of the UE and the log sum (SumOfLogUETput$_{Partial, P}$) of the estimated throughput of the UE are calculated.

First, the optimization server 600 calculates a temporary estimated PRB usage ratio (TempEstimatedUEPRBusageRatio$_{P,j_{P,m},m}$) of the serving cell j to the UE m in order to calculate the log sum of the estimated PRB usage ratio of the UE, and calculates the estimated PRB usage ratio (EstimatedUEPRBusageRatio$_{P,j_{P,m},m}$) of the UE m using the temporary estimated PRB usage ratio. The optimization server 600 may finally derive the log sum of the estimated PRB usage ratio of the UE using the estimated PRB usage ratio of the UE m.

$$TempEstimatedUEPRBusageRatio_{P,j_{P,m},m} = \qquad \text{[Equation 11]}$$
$$DataSize_m * \frac{Capacity_{Partial,P,j_{P,m},m}}{\sum_{j'_{P,m}} Capacity^2_{Partial,P,j'_{P,m},m}}$$

In Equation 11, $TempEstimatedUEPRBusageRatio_{P,j_{P,m},m}$ is a temporary estimated PRB usage ratio of the UE m to the cell $j_{P,m}$ at the power intensity P selected at each search operation, in a partial loading environment where the PRB usage ratio of all of the cells is equal to or less than a threshold for the PRB usage ratio, i.e., the PRB balancing mode, $Capacity_{Partial,CurrP,j_{CurrP,m},m}$ denotes the estimated capacity of the UE m for the cell $j_{CurrP,m}$ at the time of the current transmitting power (CurrP) in the partial loading environment, $Capacity_{Partial,P,j_{P,m},m}$ denotes the estimated capacity of the UE m for the cell $j_{P,m}$ at the time of the selected power intensity P in the partial loading environment, DataSizem denotes an amount of predicted data allocated by the UE from the serving cell (in the case of the multi-carrier, $PCell_{CurrP}$ and $SCell_{CurrP}$) at the current transmitting power (CurrP), $j_{P,m}$ denotes a serving cell index (cell indexes of the PCellP and the SCellP of the UE m) of the UE m at the power intensity P, and $j_{CurrP,m}$ denotes a serving cell index (in the case of the multi-carrier, cell indexes of the $PCell_{CurrP}$ and $SCell_{CurrP}$ of the UE m) of the UE m at the current transmitting power (CurrP).

The estimated capacity can be derived using the operation table in the optimization server 600 using the SINR of the UE as described above.

The DataSizem can be calculated as shown in Equation 12.

$$DataSize_m = \left(\sum_{j_{CurrP,m}} UEPRBusageRatio_{CurrP,j_{CurrP,m},m}\right) * \qquad \text{[Equation 12]}$$
$$\left(\sum_{j_{CurrP,m}} Capacity^2_{Partial,CurrP,j_{CurrP,m},m} \middle/ \sum_{j_m=1} Capacity_{Partial,CurrP,j_{CurrP,m},m}\right)$$

In Equation 12, $UEPRBusageRatio_{CurrP,j_{CurrP,m},m}$ denotes a PRB usage ratio which a cell $j_{CurrP,m}$ allocates to the UE m at the current transmitting power (CurrP), i.e., loading information which the optimization server 600 receives from the cell $j_{CurrP,m}$.

That is, the optimization server 600 may calculate the DataSize of the UE m based on the estimated capacity and the loading information received from the cell j at the current transmitting power.

The temporary estimated PRB usage ratio of the UE may be used as a basis for calculating the estimated PRB usage ratio.

When the sum of the temporary estimated PRB usage ratios of the respective UEs is less than 1, it means that the current PRB usage ratio is not 100%. The fact that the current PRB usage ratio is not 100% means that each UE is currently using as many PRBs as necessary. Therefore, when the sum of the temporary estimated PRB usage ratios of the respective UEs is less than 1, the optimization server 600 may set the estimated PRB usage ratio of the UE to the temporary estimated PRB usage ratio of the UE.

$$EstimatedUEPRBusageRatio_{P,j_{P,m},m} =$$
$$TempEstimatedUEPRBusageRatio_{P,j_{P,m},m} \qquad \text{[Equation 13]}$$

When the sum of the temporary estimated PRB usage ratios of the respective UEs is equal to or greater than 1, it means that each UE is not currently using as many PRBs as necessary. In this case, the optimization server 600 may set the estimated PRB usage ratio of the UE by dividing the cases as follows.

When $TempEstimatedUEPRBusageRatio_{P,m_{P,m},m} < 1/N_{UE,P,j_{P,m}}$ is satisfied, the optimization server 600 sets the estimated PRB usage ratio of the UE as shown in Equation 14.

$$EstimatedUEPRBusageRatio_{P,j_{P,m},m} =$$
$$TempEstimatedUEPRBusageRatio_{P,j_{P,m},m} \qquad \text{[Equation 14]}$$

In the above description, $N_{UE,P,j_{P,m}}$ denotes the number of UEs of the cell $j_{P,m}$ at the power intensity P, and $1/N_{UE,P,j_{P,m}}$ may mean that the UEs in the cell j divide the PRM by N and uniformly use the divided result as an average value. When the sum of the temporary estimated PRB usage ratios of the respective UEs is equal to or greater than 1 and the temporary estimated PRB usage ratio of the UE m is less than the average value, the optimization server 600 may set the estimated PRB usage ratio of the UE m to the temporary estimated PRB usage ratio of the UE m.

When $$TempEstimatedUEPRBusageRatio_{P,j_{P,m},m} <$$
$$AvailablePRBusageRatioForWorseUE_{P,j_{P,m}}/N_{WorseUE,P,j_{P,m}}$$

is satisfied while $TempEstimatedUEPRBusageRatio_{P,j_{P,m},m} < 1/N_{UE,P,j_{P,m}}$ is not satisfied, the optimization server 600 sets the estimated PRB usage ratio of the UE as shown in Equation 15.

$$EstimatedUEPRBusageRatio_{P,j_{P,m},m} =$$
$$TempEstimatedUEPRBusageRatio_{P,j_{P,m},m} \qquad \text{[Equation 15]}$$

When $$TempEstimatedUEPRBusageRatio_{P,j_{P,m},m} <$$
$$AvailablePRBusageRatioForWorseUE_{P,j_{P,m}}/N_{WorseUE,P,j_{P,m}}$$

is not satisfied while $$TempEstimatedUEPRBusageRatio_{P,j_{P,m},m} < 1/N_{UE,P,j_{P,m}}$$

is not satisfied, the optimization server 600 sets the estimated PRB usage ratio of the UE as shown in Equation 16.

$$EstimatedUEPRBusageRatio_{P,j_{P,m},m} = \qquad \text{[Equation 16]}$$
$$AvailablePRBusageRatioForWorseUE_{P,j_{P,m}}/N_{WorseUE,P,j_{P,m}}$$

Here, $$AvailablePRBusageRatioForWorseUE_{P,j_{P,m}}$$

denotes 1-(sum of EstimatedUEPRBusageRatio$_{P,j_{P,m},m}$ of the UE satisfying TempEstimatedUEPRBusageRatio$_{P,j_{P,m},m}$<1/N$_{UE,P,j_{P,m}}$) for the cell j$_{P,m}$ at the power intensity P, and N$_{WorseUE,P,j_{P,m}}$ denotes the number of UEs satisfying TempEstimatedUEPRBusageRatio$_{P,j_{P,m},m}$≥1/N$_{UE,P,j_{P,m}}$, with respect to the cell j$_{P,m}$ at the power intensity P. That is, N$_{WorseUE,P,j_{P,m}}$ denotes the number of UEs in which the temporary estimated PRB usage ratio of the UE is equal to or greater than the average value, and AvailablePRBusageRatioForWorseUE$_{P,j_{P,m}}$ denotes a value obtained by subtracting, from 1, a value obtained by adding the estimated PRB usage ratio to each UE having the temporary estimated PRB usage ratio of the UE less than the average value, and means a remaining PRB ratio available for the UE in which the temporary estimated PRB usage ratio of the UE is equal to or greater than the average value. Consequently, AvailablePRBusageRatioForWorseUE$_{P,j_{P,m}}$/N$_{WorseUE,P,j_{P,m}}$ means an average value of the remaining PRB ratio that can be used by one UE in which the temporary estimated PRB usage ratio of the UE is equal to or greater than the average value.

According to Equation 15, the optimization server 600 may set the estimated PRB usage ratio of the UE m to the temporary estimated PRB usage ratio of the UE m when the temporary estimated PRB usage ratio of the UE m is equal to or greater than the average value and $$TempEstimatedUEPRBusageRatio_{P,j_{P,m},m} <$$
$$AvailablePRBusageRatioForWorseUE_{P,j_{P,m}}/N_{WorseUE,P,j_{P,m}}$$

is satisfied. According to Equation 16, when the temporary estimated PRB usage ratio of the UE m is equal to or greater than the average value and $$TempEstimatedUEPRBusageRatio_{P,j_{P,m},m} <$$
$$AvaiablePRBusageRatioForWorseUE_{P,j_{P,m}}/N_{WorseUE,P,j_{P,m}}$$

is not satisfied, the optimization server 600 may set the estimated PRB usage ratio of the UE m to AvailablePRBusageRatioForWorseUE$_{P,j_{P,m}}$/N$_{WorseUE,P,j_{P,m}}$ which is the average value of the remaining PRB ratio that can be used by one UE in which the temporary estimated PRB usage ratio of the UE is equal to or greater than the average value. The optimization server 600 may derive an estimated total PRB usage ratio of the UE as shown in Equation 17.

$$TotalEstimatedUEPRBusageRatio_{P,m} = \qquad \text{[Equation 17]}$$
$$\sum_{j_{P,m}} EstimatedUEPRBusgeRatio_{P,j_{P,m},m}$$

In the case of the single carrier, the number of serving cells of the UE m is one, and therefore TotalEstimatedUEPRBusageRatio$_{P,m}$ may immediately be EstimatedUEPRBusageRatio$_{P,j_{P,m},m}$. On the other hand, in the case of the multi-carrier to which the CA is applied, two serving cells of the UE m, such as the Pcell and the Scell, may be present. Accordingly, in the case of the multi-carrier, the optimization server 600 may derive TotalEstimatedUEPRBusageRatioP,m by adding EstimatedUEPRBusageRatio$_{P,j_{P,m},m}$ for the Pcell of the UE m and EstimatedUEPRBusageRatio$_{P,j_{P,m},m}$ for the Scell of the UE m as shown in Equation 17.

The log sum SumOfLogTotalUEPRBusageRatio$_P$ of the estimated PRB usage ratio of the UE to be finally obtained is a sum of values obtained by performing a log on TotalEstimatedUEPRBusageRatio$_P$ of each UE, with respect to all UEs managed by the optimization server 600 at the power intensity P. The optimization server 600 may calculate the log sum of the estimated PRB usage ratio of the UE as shown in Equation 18.

$$SumOfLogTotalUEPRBusageRatio_P = \qquad \text{[Equation 18]}$$
$$\sum_m \log_{10}(TotalEstimatedUEPRBusageRatio_{P,m})$$

Meanwhile, even in the case of the PRB balancing mode, the log sum SumOfLogUETput$_{Partial,P}$ of the estimated throughput of the UE may be calculated in the same manner as that obtained in the UE number balancing mode.

The reason for calculating the log sum of the estimated throughput of the UE in the UE number balancing mode is to determine the combination of a small cell that optimizes the frequency efficiency and the power intensity according to the small cell as the search reference value in the full loading environment. On the other hand, in the PRB balancing mode, the log sum of the estimated PRB usage ratio of the UE is used as the search reference value. In the PRB balancing mode, the optimization server 600 may use the log sum SumOfLogUETput$_{Partial,P}$ of the estimated throughput of the UE in determining the combination of the small cell that optimizes the frequency efficiency and the power intensity according to the small cell, as a constraint condition.

In order to calculate the log sum SumOfLogUETput$_{Partial,P}$ of the estimated throughput of the UE, the estimated throughput UETput$_{Partial,P}$ of the UE is calculated at the power intensity P in the partial loading environment first using Equation 19.

$$UETput_{Partial,P,m} = \qquad \text{[Equation 19]}$$
$$\sum_{j_{P,m}} EstimatedUEPRBusageRatio_{P,j_{P,m},m} *$$
$$Capacity_{Partial,P,j_{P,m},m}$$

In Equation 19, j$_{P,m}$ denotes a serving cell index (in the case of the multi-carrier, cell indexes of PCell$_P$ and SCell$_P$ of the UE m) of the UE m at the power intensity P, and Capacity$_{Partial,P,j_{P,m},m}$ denotes the estimated capacity of the UE m for the cell j$_{P,m}$ at the power intensity P in the partial loading environment.

The process of deriving the estimated capacity is the same as that in the full loading environment, which is the UE number balancing mode. That is, the optimization server 600 may calculate the SINR of the UE and may derive the estimated capacity through the pre-stored operation table.

The log sum SumOfLogUETput$_{Partial,P}$ of the estimated throughput of the UE to be finally obtained is a sum of values obtained by performing a log on the estimated UE throughput of each UE, with respect to all UEs managed by the optimization server 600 at the power intensity P in the partial loading environment, and can be expressed as Equation 20.

$$SumOfLogUETput_{Partial,P} = \sum_{m} \log_{10}(UETput_{Partial,P,m})$$ [Equation 20]

Additionally, the optimization server 600 may set a certain constraint condition so that, at each search operation, the power intensity P when the constraint condition is satisfied can be excluded from the final cell combination. For example, in the case in which the load-balancing mode is the PRB balancing mode, when the search reference value (the log sum SumOfLogTotalUEPRBusageRatio$_P$ of the estimated PRB usage ratio of the UE) calculated in the current search operation satisfies a constraint condition to be described later even though the search reference value calculated in the current operation is smaller than the search reference value calculated in the preceding search operation, the search reference value calculated in the current search operation and the combination of the small cell at the time of the search reference value and the power intensity P of the small cell may not be temporarily stored. Accordingly, when the constraint condition is additionally applied in each search operation, the search reference value finally derived after the search is completed and the combination of the small cell at the time of the search reference value and the power intensity P of the small cell may be a combination that satisfies both a condition and a constraint condition for optimizing the frequency efficiency.

When the load-balancing mode is the UE number balancing mode, the optimization server 600 may exclude the combination of the small cell at the time of the power intensity P, which satisfies a constraint condition 1, and the power intensity P of the small cell from the final combination.

Constraint condition 1: $SINR_{Full,Curr,P,m} > SINR_{Full,P,m}$ and $SINR_{outage} > SINR_{Full,P,m}$ Here, $SINR_{Full,P,m}$ denotes an SINR of the UE m at the power intensity P in the full loading environment, and $SINR_{outage}$ denotes an SINR value at which an outage may occur. That is, the $SINR_{outage}$ denotes the SINR value at which a communication disconnection may occur.

In addition, in the case of the PRB balancing mode, the optimization server 600 may exclude the power intensity P of a case satisfying at least one of the following two constraints from the final cell combination.

Constraint condition 2: $SINR_{Partial,CurrP,m} > SINR_{Partial,P,m}$ and $SINR_{outage} > SINR_{Partial,P,m}$ Constraint condition 3: $SumOfLogUETput_{Partial,CurrP} > SumOfLogUETput_{Partial,P}$ When the load-balancing mode is the UE number balancing mode, the log sum of the estimated throughput of the UE is used to determine the small cell and the power intensity P of the small cell, as the search reference value. However, when the load-balancing mode is the PRB balancing mode, the log sum of the estimated PRB usage ratio of the UE is used as the search reference value, and the log sum of the estimated throughput of the UE is used as the constraint condition. In the case in which the constraint condition 3 is satisfied, when the power intensity P is selected, the log sum of the estimated throughput of the UE is lower than the current transmitting power. Therefore, the optimization server 600 does not select the power intensity P and the small cell for the power intensity P.

Figure 8:
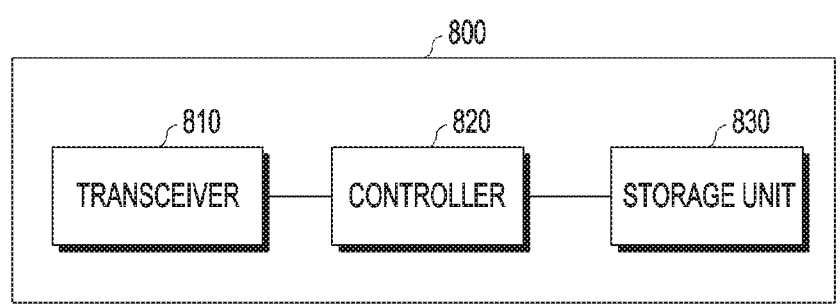
FIG. 8 is a block diagram illustrating main components of an optimization server to which a small cell control method is applied according to an embodiment.

FIG. 8 is a block diagram illustrating the main components of an optimization server to which a small cell control method of an embodiment is applied. Certain details of the description above with reference to FIGS. 1 to 7 are applicable.

An optimization server 800 includes a transmission/reception unit 810, i.e., a transceiver, configured to receive information on a cell from one or more macrocells managed by the optimization server 800, one or more small cells, and a system management server; and a controller 820 configured to control the transmission/reception unit 810 to perform the operation of the optimization server 800 described in an embodiment and to transmit determination information on a target to be turned on or off to the corresponding small cell. The optimization server 800 may further include a storage unit 830 configured to store the information on the cell.

The above-described operations may be realized in such a manner that a memory device storing a corresponding program code is provided in the optimization server 800. That is, the controller 820 of the optimization server 800 may execute the above-described operations by reading and executing the program code stored in the memory device by a processor or a central processing unit (CPU).

It should be noted that the exemplary diagrams, flowcharts, system configuration diagrams, apparatus configuration diagrams, and the like illustrated in FIGS. 1 to 8 are not intended to limit the scope of the disclosure. That is, it should not be construed that all of the components or operations described in FIGS. 1 to 8 above are essential components for the implementation of the disclosure, and the disclosure, including only some of the components, may be implemented without departing from the spirit of the disclosure.

The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A small cell control method performed by a server, the small cell control method comprising:
   acquiring information on a plurality of cells;
   identifying at least one candidate small cell among the plurality of cells by determining whether one cell is overlaid on an other cell, among the plurality of cells, based on the information on the plurality of cells;
   identifying at least one small cell to control a transmitting power among the plurality of cells based on the at least one candidate small cell; and
   controlling the at least one small cell, wherein the information on the plurality of cells comprises information based on a received signal strength of an uplink reference signal, the identifying the at least one candidate small cell further comprises:
   determining that the one cell is overlaid on the other cell based on a ratio of a number of user equipment apparatuses having a signal quality value for the other cell equal to or greater than a threshold to a total number of the user equipment apparatuses, and
   identifying the one cell overlaid on the other cell as the at least one candidate small cell, based on the determining that the one cell is overlaid on the other cell, and the user equipment apparatuses are disposed within a coverage area of the one cell.

2. The small cell control method of claim 1, wherein
the signal quality value of the user equipment apparatuses for the other cell, respectively, is acquired based on the information on the plurality of cells.

3. The small cell control method of claim 2, wherein the signal quality value of the user equipment apparatuses for the other cell, respectively, is at least one from among a signal to noise ratio (SNR) and a signal to interference plus noise ratio (SINR) of a user equipment apparatus within a coverage area of the one cell to the other cell.

4. A small cell control method performed by a server, the small cell control method comprising:
   acquiring information on a plurality of cells;
   identifying at least one candidate small cell among the plurality of cells by determining whether one cell is overlaid on an other cell, among the plurality of cells, based on the information on the plurality of cells;
   identifying at least one small cell to control a transmitting power among the plurality of cells based on the at least one candidate small cell; and
   controlling the at least one small cell,
   wherein the information on the plurality of cells comprises information based on a received signal strength of an uplink reference signal,
   wherein the identifying the at least one candidate small cell further comprises identifying a plurality of small cell candidates, and
   the identifying the at least one small cell to control the transmitting power further comprises:
      selecting a small cell among the plurality of small cell candidates, determining a power intensity of the selected small cell,
      obtaining a reference value for the selected small cell and the determined power intensity, and
   determining whether to control the selected small cell based on the reference value,
   wherein the obtaining the reference value for the selected small cell and the determined power intensity further comprises obtaining the reference value based on a load-balancing mode determined according to whether a resource usage ratio of the plurality of cells managed by the server exceeds a threshold, and
   wherein the obtaining the reference value further comprises the obtaining the reference value by obtaining the reference value based on a physical resource block (PRB) usage ratio of a user equipment apparatus based on the resource usage ratio being equal to or less than the threshold.

5. A small cell control method performed by a server, the small cell control method comprising:
   acquiring information on a plurality of cells;
   identifying at least one candidate small cell among the plurality of cells by determining whether one cell is overlaid on an other cell, among the plurality of cells, based on the information on the plurality of cells;
   identifying at least one small cell to control a transmitting power among the plurality of cells based on the at least one candidate small cell; and
   controlling the at least one small cell,
   wherein the information on the plurality of cells comprises information based on a received signal strength of an uplink reference signal,
   the identifying the at least one candidate small cell further comprises identifying a plurality of small cell candidates,
   the identifying the at least one small cell to control the transmitting power further comprises:
      selecting a small cell among the plurality of small cell candidates, determining a power intensity of the selected small cell,
      obtaining a reference value for the selected small cell and the determined power intensity, and
      determining whether to control the selected small cell based on the reference value, wherein the obtaining the reference value for the selected small cell and the determined power intensity further comprises obtaining the reference value based on a load-balancing mode determined according to whether a resource usage ratio of the plurality of cells managed by the server exceeds a threshold, and
   the determining whether to control the selected small cell further comprises identifying a small cell that minimizes the obtained reference value and the power intensity of the small cell to control the transmitting power of the small cell as the power intensity.

6. A server that manages at least one macrocell and at least one small cell, the server comprising:
   a transceiver configured to acquire information on a plurality of cells; and a controller configured:
      identify at least one candidate small cell by determining whether one cell is overlaid on an other cell, among the plurality of cells, based on the information on the plurality of cells, and
   identify at least one small cell based on the at least one candidate small cell to control a transmitting power among the plurality of cells,
   wherein the information on the plurality of cells comprises information based on a received signal strength of an uplink reference signal,
   the controller is further configured to:
      determine that the one cell is overlaid on the other cell based on a ratio of a number of user equipment apparatuses having a signal quality value for the other cell equal to or greater than a threshold to a total number of the user equipment apparatuses, and
      based on the determining that the one cell is overlaid on the other cell, identify the one cell as the at least one candidate small cell, and
   the user equipment apparatuses are disposed within a coverage area of the one cell.

7. The server of claim 6, wherein
the signal quality value of the user equipment apparatuses for the other cell, respectively, is acquired based on the information on the plurality of cells.

8. The server of claim 7, wherein the signal quality value of the user equipment apparatuses for the other cell, respectively, is at least one from among a signal to noise ratio (SNR) and a signal to interference plus noise ratio (SINR) of a user equipment apparatus within a coverage area of the one cell to the other cell.

9. A server that manages at least one macrocell and at least one small cell, the server comprising:
 a transceiver configured to acquire information on a plurality of cells; and a controller configured:
  identify at least one candidate small cell by determining whether one cell is overlaid on an other cell, among the plurality of cells, based on the information on the plurality of cells, and
  identify at least one small cell based on the at least one candidate small cell to control a transmitting power among the plurality of cells,
 wherein the information on the plurality of cells comprises information based on a received signal strength of an uplink reference signal,
 wherein the controller is further configured to:
  identify a plurality of small cell candidates,
  select a small cell among the plurality of small cell candidates, determine a power intensity of the selected small cell,
  obtain a reference value for the selected small cell and the determined power intensity, and
  determine whether to control the selected small cell based on the reference value,
 wherein the controller is further configured to obtain the reference value based on a load-balancing mode determined according to whether a resource usage ratio of the plurality of cells managed by the server exceeds a threshold, and
 wherein the controller is further configured to obtain the reference value based on a physical resource block (PRB) usage ratio of a user equipment apparatus based on the resource usage ratio being equal to or less than the threshold.

10. A server that manages at least one macrocell and at least one small cell, the server comprising:
 a transceiver configured to acquire information on a plurality of cells; and a controller configured:
  identify at least one candidate small cell by determining whether one cell is overlaid on an other cell, among the plurality of cells, based on the information on the plurality of cells, and
  identify at least one small cell based on the at least one candidate small cell to control a transmitting power among the plurality of cells,
 wherein the information on the plurality of cells comprises information based on a received signal strength of an uplink reference signal,
 wherein the controller is further configured to:
  identify a plurality of small cell candidates,
  select a small cell among the plurality of small cell candidates, determine a power intensity of the selected small cell,
  obtain a reference value for the selected small cell and the determined power intensity, and
  determine whether to control the selected small cell based on the reference value,
 wherein the controller is further configured to obtain the reference value based on a load-balancing mode determined according to whether a resource usage ratio of the plurality of cells managed by the server exceeds a threshold, and
 wherein the controller is further configured to identify a small cell that minimizes the obtained reference value and the power intensity of the small cell to control the transmitting power of the small cell as the power intensity.

11. A method of controlling a small cell in a macro base station controlling a small cell and a macrocell, the method comprising:
 acquiring information on a plurality of cells;
  identifying at least one candidate small cell by among the plurality of cells determining whether one cell is overlaid on an other cell, among the plurality of cells, based on the information; identifying at least one small cell to control a transmitting power among the plurality of cells based on the at least one candidate small cell; and
 controlling the at least one small cell, wherein the information comprises information based on a received signal strength of an uplink reference signal,
 the identifying the at least one candidate small cell further comprises:
  determining that the one cell is overlaid on the other cell based on a ratio of a number of user equipment apparatuses having a signal quality value for the other cell equal to or greater than a threshold to a total number of the user equipment apparatuses, and
  identifying the one cell overlaid on the other cell as the at least one candidate small cell, based on the determining that the one cell is overlaid on the other cell, and
 the user equipment apparatuses are disposed within a coverage area of the one cell.

12. The method of claim 11, wherein
 the signal quality value of the user equipment apparatuses for the other cell, respectively, is acquired based on the information on the plurality of cells.

13. The method of claim 11, wherein the identifying the at least one candidate small cell further comprises identifying a plurality of small cell candidates, and
 the identifying the at least one small cell to control the transmitting power further comprises:
  selecting a small cell among the plurality of small cell candidates, determining a power intensity of the selected small cell,
  obtaining a reference value for the selected small cell and the determined power intensity, and
  determining whether to control the selected small cell based on the reference value.

14. A non-transitory computer-readable recording medium storing instructions thereon, which instructions, when executed by a processor of a server, cause the processor to perform a method comprising:
 acquiring information on a plurality of cells comprising a macrocell and a small cell, the information comprising at least a received signal strength of an uplink reference signal;
 determining whether the small cell is overlaid on the macrocell based on the received information;
 identifying the small cell to control a transmitting power based on the determining that the small cell is overlaid on the macrocell; and
 controlling the small cell to be ON or OFF,
 wherein the determining further comprises determining that the small cell is overlaid on the macrocell based on a ratio of a number of user equipment apparatuses having a signal quality value for the macrocell equal to or greater than a threshold to a total number of the user equipment apparatuses, and the user equipment apparatuses are disposed within a coverage area of the small cell.

15. The non-transitory computer-readable recording medium of claim 14, wherein the method further comprises:

determining, at time intervals, whether the small cell remains overlaid on the macrocell; turning ON the small cell based on the determining that the small cell is not overlaid on the macrocell; and maintaining an OFF condition of the small cell based on the determining that the small cell remains overlaid on the macrocell.

* * * * *